(12) United States Patent
Maas et al.

(10) Patent No.: US 7,271,075 B2
(45) Date of Patent: Sep. 18, 2007

(54) METHOD AND A DEVICE FOR BONDING TWO PLATE-SHAPED OBJECTS

(75) Inventors: Henricus Godefridus Rafael Maas, Eindhoven (NL); Theodorus Martinus Michielsen, Eindhoven (NL); Richard Jozef Maria Waelen, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 246 days.

(21) Appl. No.: 10/526,191

(22) PCT Filed: Aug. 4, 2003

(86) PCT No.: PCT/IB03/03423

§ 371 (c)(1),
(2), (4) Date: Mar. 1, 2005

(87) PCT Pub. No.: WO2004/022662

PCT Pub. Date: Mar. 18, 2004

(65) Prior Publication Data
US 2005/0245047 A1    Nov. 3, 2005

(30) Foreign Application Priority Data
Sep. 4, 2002    (EP)    ................... 02078629

(51) Int. Cl.
*H01L 21/30*    (2006.01)
(52) U.S. Cl. ................ 438/455; 438/106; 257/E21.567
(58) Field of Classification Search .................... None
See application file for complete search history.

(56) References Cited

U.S. PATENT DOCUMENTS

| | | | |
|---|---|---|---|
| 6,051,481 A | 4/2000 | Kuiken et al. | |
| 2002/0108707 A1* | 8/2002 | Kobayashi et al. | 156/275.5 |
| 2004/0011457 A1* | 1/2004 | Kobayashi et al. | 156/272.2 |
| 2004/0149215 A1* | 8/2004 | Shao et al. | 118/722 |

* cited by examiner

*Primary Examiner*—Michael Lebentritt
*Assistant Examiner*—Cheung Lee
(74) *Attorney, Agent, or Firm*—Paul Im

(57) ABSTRACT

A method for bonding two plate-shaped objects (5) with an adhesive which is cured by ultraviolet light irradiation and by heating. The two plate-shaped objects (5) with the adhesive in between are transported into a cure chamber (11) comprising an ultraviolet lamp (12) and a heating element (13). A moveable heat-shielding member (3) is temporary present between the objects (5) and the heating element (13) during at least the first part of the irradiation treatment. Preferably, the heat-shielding member (3) is positioned outside the cure chamber (11) during a part of the curve treatment.

6 Claims, 3 Drawing Sheets

METHOD AND A DEVICE FOR BONDING TWO PLATE-SHAPED OBJECTS

Figure 1:
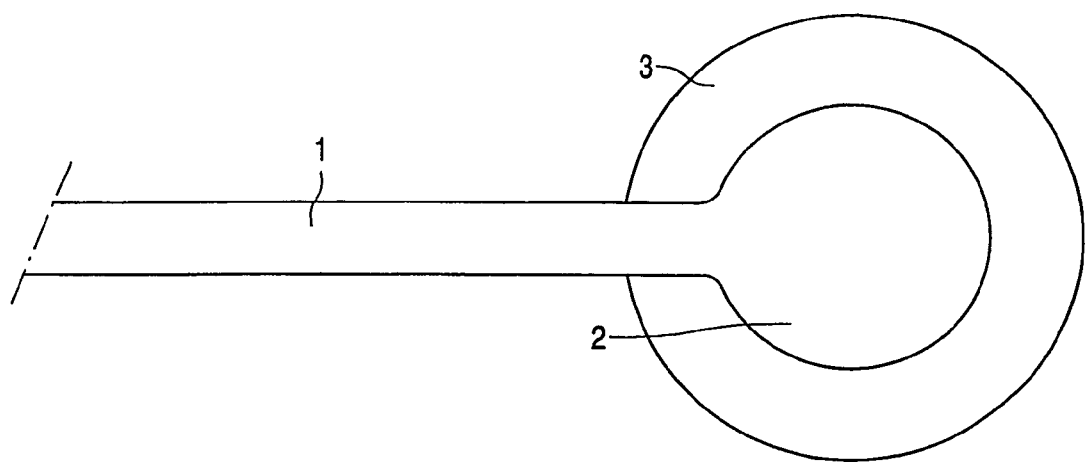

The invention relates to a method an a device for bonding two plate-shaped objects with an adhesive which is cured by ultraviolet light irradiation and by heating. Such method can be used in the manufacture of a so-called SOA-semiconductor device (Silicon-On-Anything-semiconductor device) for bonding a disc-shaped semiconductor substrate to a disc-shaped insulating carrier, such as a glass carrier.

U.S. Pat. No. 6,051,481 discloses a method for dispersing an adhesive between two plate-shaped objects, whereby the two objects are rotated while being pressed together, so that the adhesive between the two objects spreads homogeneously under the influence of the centrifugal force acting on the adhesive. After adhesive is applied between two objects, according to U.S. Pat. No. 6,051,481 or in any other way, it may be required to cure the adhesive by ultraviolet light irradiation and/or by heating, depending on the type of adhesive. The invention relates to a method whereby both treatments, light irradiation as well as heating, are applied.

It is advantageous to make use of only one cure chamber in which the curing treatment of the adhesive takes place. Thereby both the irradiation lamp and the heating element must be present in the cure chamber, for irradiating and for heating the adhesive between the two objects.

In case the two plate-shaped objects have a different coefficient of expansion, the bonded objects may be warped or curled because during the curing treatment the temperature of the objects is different (higher) from the temperature of the bonded objects afterwards.

The object of the invention is to decrease the tendency of warping or curling of the bonded plate-shaped objects.

In order to accomplish that objective, the two plate-shaped objects with the adhesive in between are transported into the cure chamber—comprising an ultraviolet lamp and a heating element—whereby a movable heat-shielding member is temporary present between the objects and the heating element during at least the first part of the irradiation treatment. Thereby the adhesive will bond together the two plate-shaped objects to a certain degree before the temperature of the objects will substantially increase.

Because the temperature in the cure chamber will be higher the temperature outside the cure chamber, preferably, the movable heat-shielding member is positioned outside the cure chamber during a part of the cure treatment, so that the heat-shielding member can cool down In one preferred embodiment, the heat-shielding member is a portion of (or attached to) a carrier for transporting the said objects into the cure chamber. Thereby the objects and the heat-shielding member will enter into the cure chamber at the same time. Thereupon the carrier may remain in the cure chamber for at least 30 seconds, preferably for more than 60 seconds, and subsequently the carrier is removed out of the cure chamber while the said objects remain in the cure chamber for at least 60 seconds.

Preferably, the said objects are moved in the direction of the heating element after the carrier has been removed out of the cure chamber, so that the objects can be heated quickly to the desired temperature.

Preferably, the method for bonding two plate-shaped objects with an adhesive which is cured by ultraviolet light irradiation and by heating comprises the following steps: (a) moving two plate-shaped objects with an adhesive in between into a cure chamber comprising an ultraviolet irradiation lamp and a heating element, (b) keeping a heat-shielding member between the said objects and the heating element during at least 30 seconds while the said objects are exposed to ultraviolet irradiation, (c) removing the heat-shielding member for at least 60 seconds while the said objects are heated by the heating element, and (d) removing the said objects out of the cure chamber.

The invention also relates to a device for bonding two plate-shaped objects with an adhesive which is cured by ultraviolet light irradiation and by heating, comprising a cure chamber with an ultraviolet irradiation lamp and a heating element, and comprising a movable heat-shielding member which can be temporary present between the heating element and the said two plate shaped objects.

Figure 2:
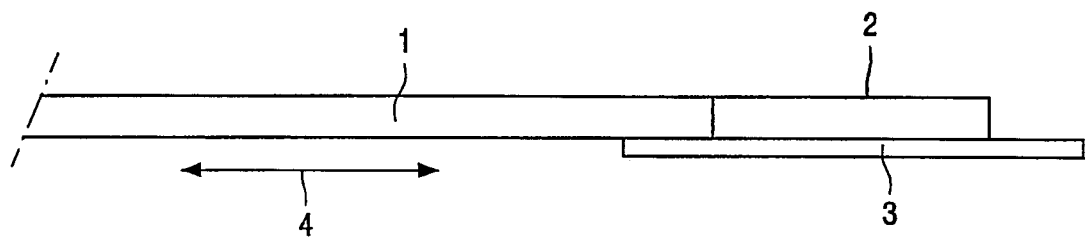
Figure 3:
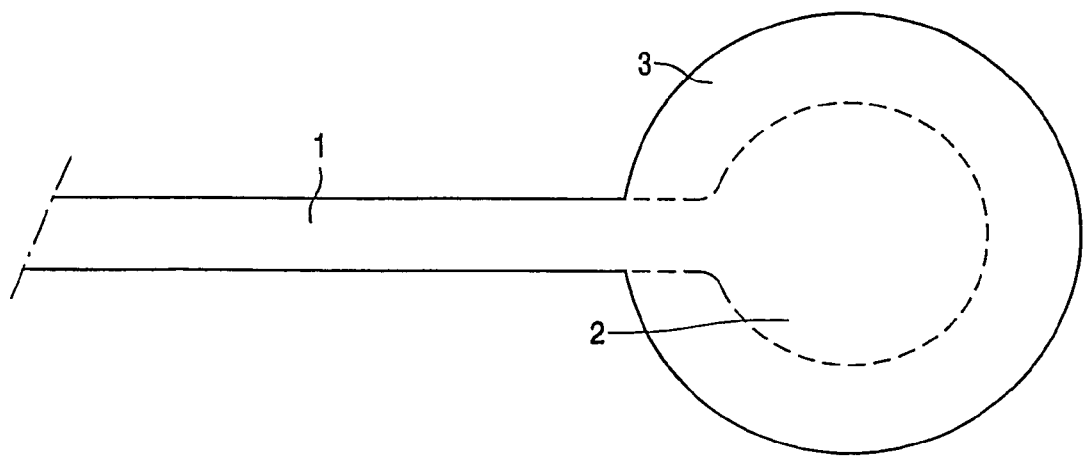
Figure 4:
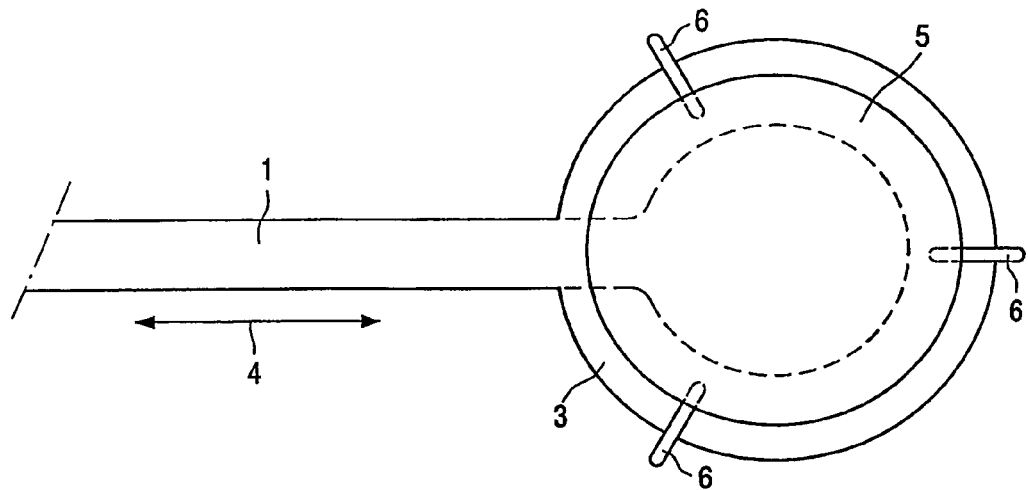
Figure 5:
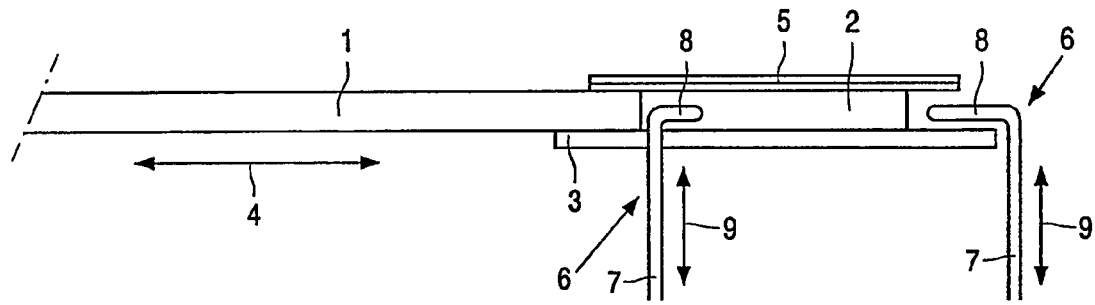
Figure 6:
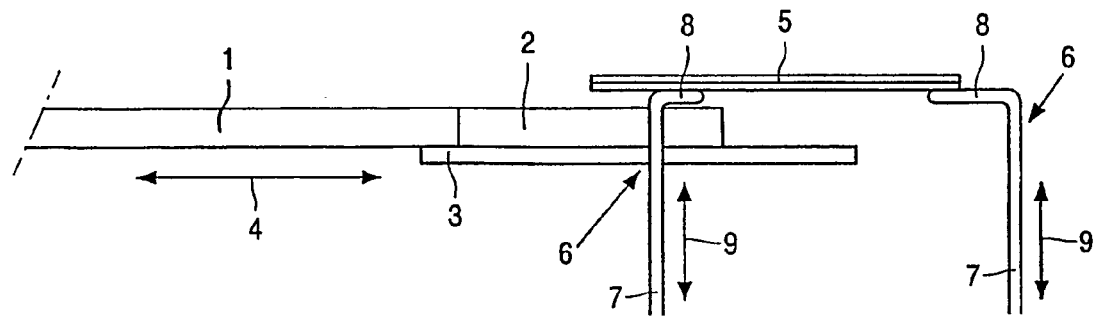
Figure 7:
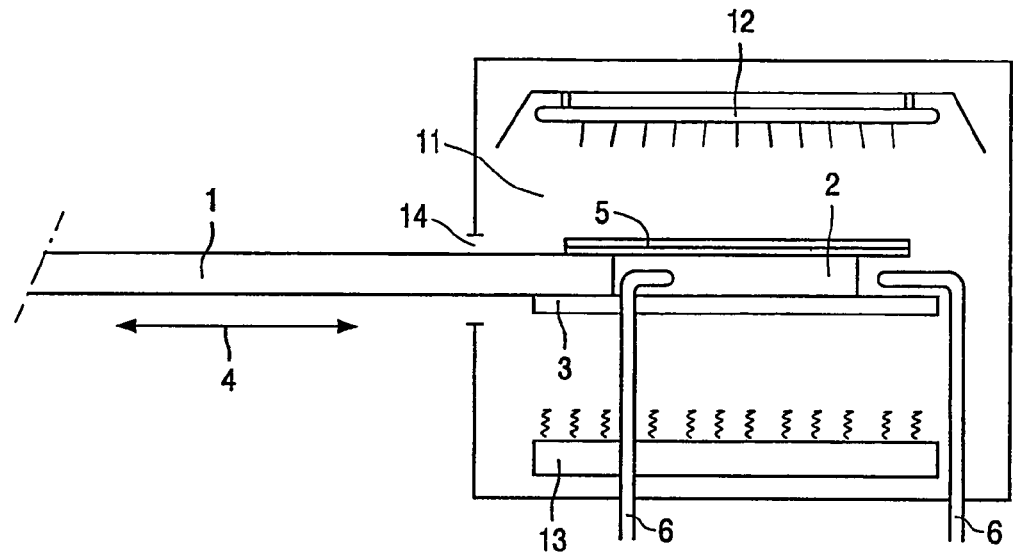
Figure 8:
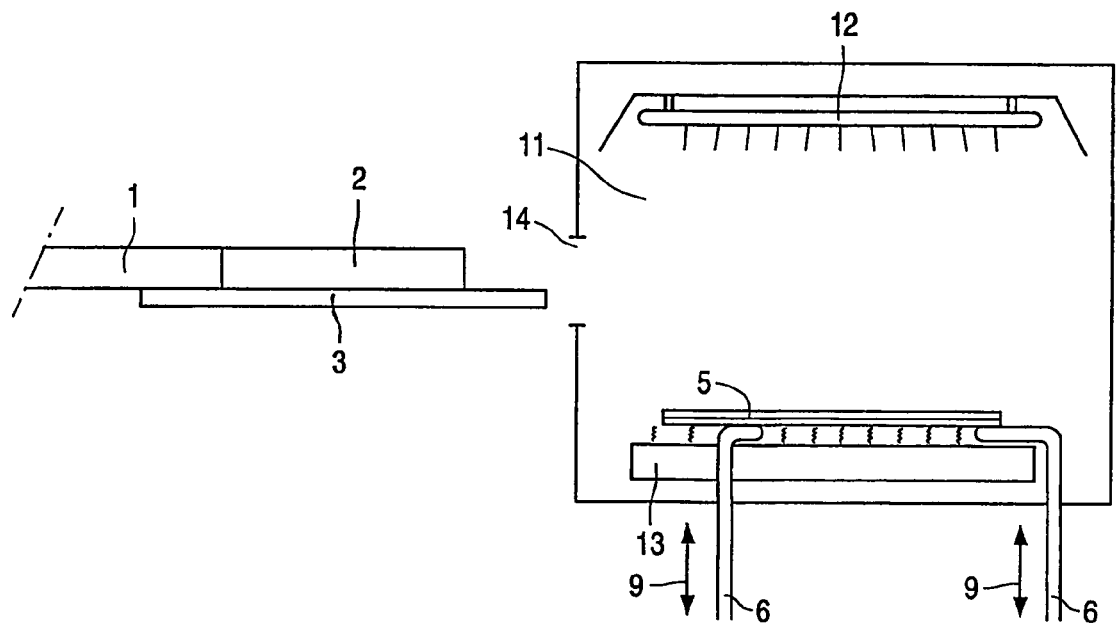

The invention will be explained in more detail hereinafter by means of a description of an embodiment, in which reference is made to a drawing, in which:

FIG. 1 is a top view showing a carrier;
FIG. 2 is a side view of the carrier;
FIG. 3 is a bottom view of the carrier;
FIG. 4 is a top view of the carrier carrying two plate-shaped objects;
FIG. 5 is a side view of the carrier according to FIG. 4;
FIG. 6 is a side view of the carrier in a different position;
FIG. 7 shows a cure chamber with the carrier inside; and
FIG. 8 shows the cure chamber with the carrier outside.

The figs. are merely schematic representations of the embodiment, in which less relevant parts are not shown.

FIGS. 1-3 show a carrier comprising a arm 1 bearing at its end a support table 2 having a substantially round and flat upper surface. Underneath the support table 2 a heat-shielding member 3 is attached to it. The heat-shielding member 3 is a disc-shaped member made of heat insulating material. Arrow 4 indicates the direction of movement of the carrier 1,2.

FIGS. 4 and 5 show the carrier 1,2 according to FIGS. 1-3, whereby the carrier is carrying two plate shaped objects 5. The two plate-shaped objects are both disc-shaped and are provided with a layer of adhesive in between. The layer adhesive has to be cured by ultraviolet light irradiation as well as by heating. The carrier 1,2 can move in the direction indicated by arrow 4 to transport the two objects 5 into a cure chamber and afterwards out of the cure chamber 11 (FIGS. 7 and 8).

Within the cure chamber there are three support bars 6 having a vertical portion 7 and a horizontal portion 8 (see FIG. 5). The support bars 6 can move in vertical direction as indicated by arrows 9. Thereby the horizontal portions 8 of the support bars 6 can lift the objects 5 from the support table 2, so that the carrier can move (arrow 4) leaving the two objects 5 in the cure chamber 11. Thereby the objects are carried by the support bars 6 as shown in FIG. 6.

FIGS. 7 and 8 show the cure chamber 11 containing an ultraviolet irradiation lamp 12 in its upper part and a heating element 13 in its lower part. The cure chamber 11 is provided with an opening 14 through which the carrier 1,2—together with the heat-shielding member 3 attached to it—can be moved into and out of the cure chamber 11. Arrow 4 indicates the direction of movement.

FIG. 7 shows the carrier 1,2 after it is entered into the cure chamber 11. The carrier 1,2 carries two plate shaped objects 5 as already shown in FIG. 5. After entering the cure chamber 11 the two objects 5 are irradiated by the ultraviolet lamp 12 to cure the layer of adhesive between the objects.

To prevent the two objects 5 from heating during the first part of the cure treatment, the carrier 1,2 is provided with the heat-shielding member 3 in such way that the heat-shielding member is located between the two objects 5 and the heating element 13 in the lower part of the cure chamber 11. So, as long as the carrier 1,2 is inside the cure chamber 11, the two objects 5 shall not be heated by the heating element 13, at least the heating will be reduced.

After the first part of the cure treatment has taken place, the two objects 5 are lifted from the carrier 1,2 by the three support bars 6 (as shown in FIG. 6), so that the carrier 1,2—together with the heat-shielding member 3—can be moved out of the cure chamber 11. Subsequently the three support bars 6 are moved downward to bring the two objects 5 closer to the heating element 13, whereby the objects 5 may rest on the heating element 13. Thereby the support bars 6 may move into recesses (not shown) in the heating element 13. After the cure treatment is completed the three support bars 6 move upwardly, so that the carrier 1,2 can move back into the cure chamber 11. Then the support bars 6 replace the objects 5 on the carrier 1,2 and the objects 5 can be transported by the carrier 1,2 out of the cure chamber 11.

The described embodiment of the device for bonding two plate shaped objects is merely an example, a great many other embodiments are possible.

The invention claimed is:

1. A method for bonding two plate-shaped objects with an adhesive which is cured by ultraviolet light irradiation and by heating, whereby the two plate-shaped objects with the adhesive in between are transported into a cure chamber comprising an ultraviolet lamp and a heating element, whereby a movable heat-shielding member is temporarily present between the objects and the heating element during at least a first part of the irradiation treatment.

2. A method as claimed in claim 1, characterized in that the movable heat-shielding member is positioned outside the cure chamber during a part of the cure treatment.

3. A method as claimed in claim 1, characterized in that the heat-shielding member is a portion of a carrier for transporting the said objects into the cure chamber.

4. A method as claimed in claim 3, characterized in that, during the cure treatment, the carrier remains in the cure chamber for at least 30 seconds, preferably for more than 60 seconds, and that subsequently the carrier is removed out of the cure chamber while the said objects remain in the cure chamber for at least 60 seconds.

5. A method as claimed in claim 4, characterized in that the said objects are moved in the direction of the heating element after the carrier has been removed out of the cure chamber.

6. A method as claimed in claim 1, characterized by the following steps:
   (a) moving two plate-shaped objects with an adhesive in between into a cure chamber comprising an ultraviolet irradiation lamp and a heating element;
   (b) keeping a heat-shielding member between the said objects and the heating element during at least 30 seconds while the said objects are exposed to ultraviolet irradiation;
   (c) removing the heat-shielding member for at least 60 seconds while the said objects are heated by the heating element;
   (d) removing the said objects out of the cure chamber.

* * * * *